July 10, 1923.
V. PELLISSIER
1,461,198
CONTROLLING DEVICE FOR DRAWN IMPLEMENTS
Filed Dec. 5, 1921
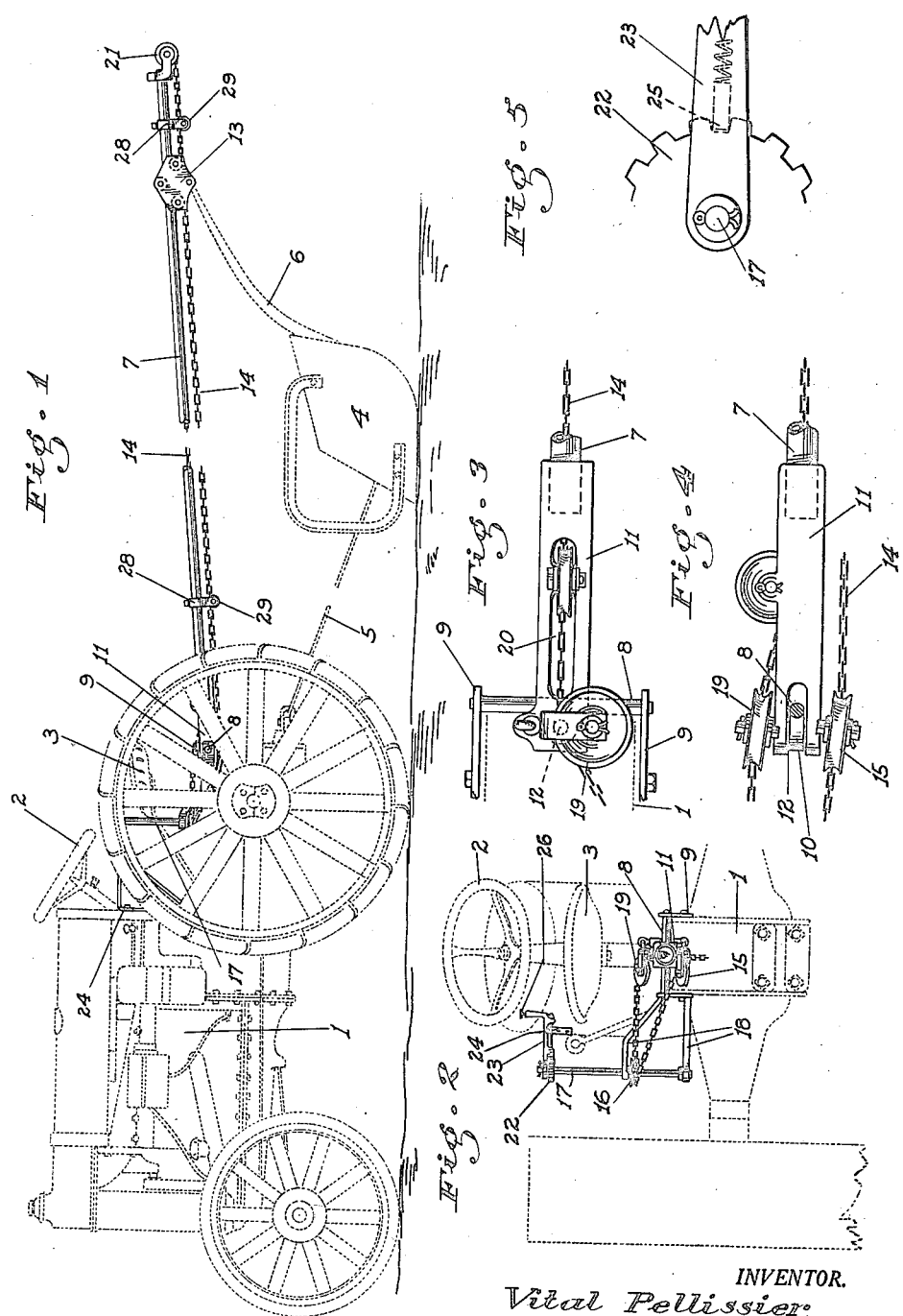
INVENTOR.
Vital Pellissier
BY
ATTORNEY Patented July 10, 1923.

1,461,198

UNITED STATES PATENT OFFICE.

VITAL PELLISSIER, OF MERCED, CALIFORNIA.

CONTROLLING DEVICE FOR DRAWN IMPLEMENTS.

Application filed December 5, 1921. Serial No. 520,016.

*To all whom it may concern:*

Be it known that I, VITAL PELLISSIER, a citizen of France, residing at Merced, in the county of Merced, State of California, have invented certain new and useful Improvements in Controlling Devices for Drawn Implements; and I do declare the following to be a full, clear, and exact description of the same, reference being had to the accompanying drawings and to the characters of reference marked thereon, which form a part of this application.

This invention relates to improvements in means for controlling the operations of drawn implements from the vehicle, such as a tractor or the like, drawing or pulling the same, and is especially adapted and intended to be used in connection with implements whose movements are controlled by a more or less vertically positioned lever, such as scrapers and the like.

The principal object of my invention is to provide a mechanism, connected to such a lever, and adapted to be operated by the driver of the draft vehicle, in such a manner that the lever may be positively moved back and forth throughout the possible limits of its travel, and held in any desired position.

Another object is to provide a device for the purpose which is not made as a part of any scraper or other implement, but is a separate member, easily attached or disconnected from any such implement, and also, if desired, from the draft vehicle itself.

A further object of the invention is to produce a simple and inexpensive device, and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Fig. 1 is a side outline of a tractor and a form of scraper, showing my improved control mechanism arranged in connection therewith.

Fig. 2 is a fragmentary end view of the tractor, showing a form of hand operating mechanism for the device.

Fig. 3 is a top plan view of the tractor end of the control device beam.

Fig. 4 is a side view of the same.

Fig. 5 is a fragmentary plan, of a ratchet lever mechanism.

Referring now more particularly to the characters of refernce on the drawings, the numeral 1 denotes in general a tractor of a certain type, in which 2 is the steering wheel and 3 the driver's seat. The numeral 4 denotes a scraper or other implement, connected to the tractor to be drawn thereby by a drawbar or link 5 of any suitable character. This scraper is provided with a normally upstanding lever or arm 6, by means of which the scraping, carrying or dumping movements of the scraper is controlled.

My improved device comprises a rigid beam 7 projecting rearwardly of the tractor and connected thereto at a predetermined level for vertical and lateral swinging movement about its point of connection as an axis.

This may be done for instance by means of a horizontal and transverse shaft 8, turnably mounted between brackets 9 fixed to the frame of the tractor.

This shaft is provided with a central and horizontally disposed lug 10, which, together with the adjacent portion of the shaft, is straddled by the adjacent end of the beam 7, or as shown, by a separate extension 11 to which that end of the beam is fixed.

This extension is swivelly connected to the lug 10 by means of a vertical pin or bolt 12.

The beam 7 and extension 11 (hereafter mainly considered as one member) are hollow and depending therefrom and mounted thereon for longitudinal movement is a carriage 13, to the lower end of which the upper end of the lever 6 is pivotally and removably connected. To the forward end of the carriage, under the beam, is connected a chain or similar flexible member 14, which runs forwardly to and around a horizontal and swivelly mounted guide pulley 15 on the under side of the member 11, positioned adjacent the swivel bolt 12. From around this pulley the chain passes around a sprocket pulley 16 or gripping sheave fixed on a shaft 17 which is turnably mounted to the tractor by brackets or supports 18.

From around this sprocket the chain passes around a flexibly mounted guide pulley 19 on and above the member 11 in vertical alinement with the pulley 15, and thence into and along the beam 7 through a slot 20 adjacent the pulley 19. At the rear end of the beam, the chain passes around a guide pulley 21 fixed thereon and doubles back on its course, outside said beam to a connection with the rear end of the carriage 13. To all intents and purposes, then, the chain 14 is endless, with the carriage interposed at some point in the length thereof.

It will thus be evident that on turning the shaft 17, the chain and carriage will be moved lengthwise of the beam one way or the other, pulling the lever 6 in a corresponding direction, and so controlling the operations or movements of the scraper or other implement. As the lever rises up or lowers as it moves about its pivotal connection, the beam 7 moves up or down likewise, about the shaft 8 as an axis.

The pulleys 15 and 19 are of course interposed merely to change the line of direction of the chain, since the beam 7 is preferably in a plane centrally of the width of the tractor, while the shaft 17 and sprocket 16 are naturally to one side of such plane, so as to be within easy reach and to one side of the driver on his seat 3.

The shaft 17 may be turned, and held at any point so as to likewise hold the chain and lever 6, by probably a good many methods, and may be worked by hand, or connected to be operated by power derived from the engine of the tractor.

I have shown here a hand controlling means, particularly adapted for use when space in which to operate is somewhat limited, and which I will now describe.

The shaft 17 is vertical and is positioned suitably with relation to the steering wheel 2 and seat 3, and to which ever side of the latter is preferable.

On the upper end of the shaft is fixed a square-notched wheel 22. Turnably mounted on the shaft 17 adjacent said wheel is a horizontally disposed lever member 23, adapted to be held in a certain position by means of a spring bracket or clip 24 fastened to and projecting from some rigid member of the tractor. Mounted within the lever is a pawl 25 in alinement with the ratchet wheel 22, which pawl may be released by a finger actuated member 26 extending to the outer end of the lever.

When rotation of the shaft and lever is not desired, the lever is moved to be engaged by the clip 24.

At the same time, by holding out the pawl, the scraper may dump or otherwise function automatically if desired, since in that case the sheave 16 is free to turn, and the chain and carriage are likewise free to move.

To limit the extent of movement allowed the carriage in either direction, I provide adjustable collars 28 on the beam on both sides of the carriage, and against which the latter is adapted to abut. I also preferably use guide pulleys 29 on said collars or stops, through which the under run of the chain passes, and which prevents undue swaying and slack of the same.

From the foregoing description it will be readily seen that I have produced such a device as substantially fulfills the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:

1. A control device for drawn implements comprising a beam universally mounted to a draft vehicle and projecting rearwardly therefrom, a carriage mounted for longitudinal movement on the beam and adapted to be connected to an operating lever of the drawn implement, and means operable from the draft vehicle for moving the carriage in either direction.

2. A control device for drawn implements comprising a beam universally mounted to a draft vehicle and projecting rearwardly therefrom, and an endless flexible member adapted to be driven from the draft vehicle supported by and extending lengthwise of the beam, and adapted to be connected to the operating lever of the drawn implement.

3. A control device for drawn implements comprising a beam universally mounted to a draft vehicle and projecting rearwardly therefrom, a carriage mounted for longitudinal movement on the beam and adapted to be connected to an operating lever of the drawn implement, an endless flexible member supported by and extending lengthwise of the beam and in the length of which the carriage is interposed and connected, and means operable from the draft vehicle for moving said flexible member in either direction.

4. A control device for drawn implements comprising a beam universally mounted to a draft vehicle and projecting rearwardly therefrom, a carriage mounted for longitudinal movement on the beam and adapted to be connected to an operating lever of the drawn implement, an endless flexible member supported by and extending lengthwise of the beam and in the length of which the carriage is interposed and connected, a gripping sheave about which said flexible member passes mounted on the draft vehicle, and means operable by the driver of said vehicle for turning the sheave in either direction.

5. A control device for drawn implements comprising a beam universally mounted to a draft vehicle and projecting rearwardly therefrom, a carriage mounted for longitudinal movement on the beam and adapted to be connected to an operating lever of the drawn implement, an endless flexible member supported by and extending lengthwise of the beam and in the length of which the carriage is interposed and connected, a gripping sheave about which said flexible member passes mounted on the draft vehicle, operating means controlled by the driver of the draft vehicle for positively turning the sheave in either direction, and means whereby said operating means may be disconnected from the sheave to allow free rotation of the latter.

6. A control device for drawn implements comprising a beam universally mounted to a draft vehicle and projecting rearwardly therefrom, a carriage mounted for longitudinal movement on the beam and adapted to be connected to an operating lever of the drawn implement, an endless flexible member supported by and extending lengthwise of the beam and in the length of which the carriage is interposed and connected, a gripping sheave about which said flexible member passes mounted on the draft vehicle, operating means controlled by the driver of the draft vehicle for positively turning the sheave in either direction, and means whereby said operating means may be disconnected from the sheave to allow free rotation of the latter and consequent movement of the carriage along the beam, and adjustable means for automatically limiting the possible extent of such movement.

In testimony whereof I affix my signature.

VITAL PELLISSIER.